Dec. 18, 1956    J. A. EDINBORGH    2,774,938
ELECTRONIC MOISTURE METER
Filed Jan. 15, 1952
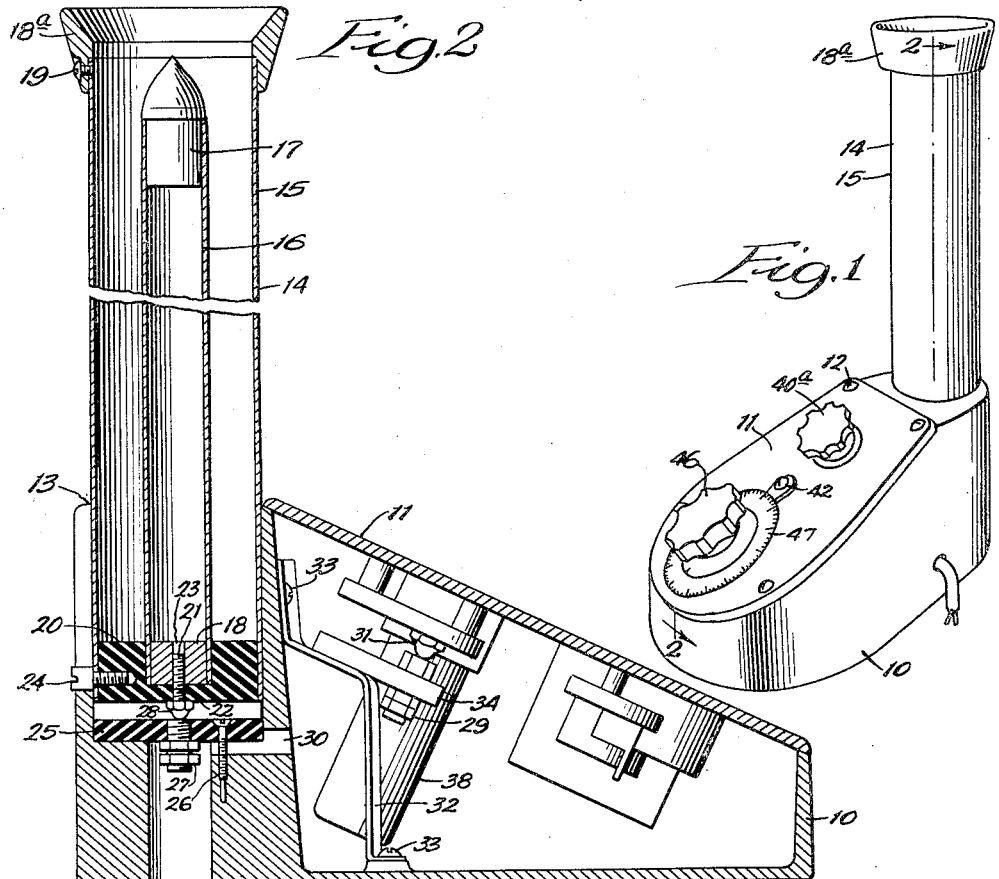
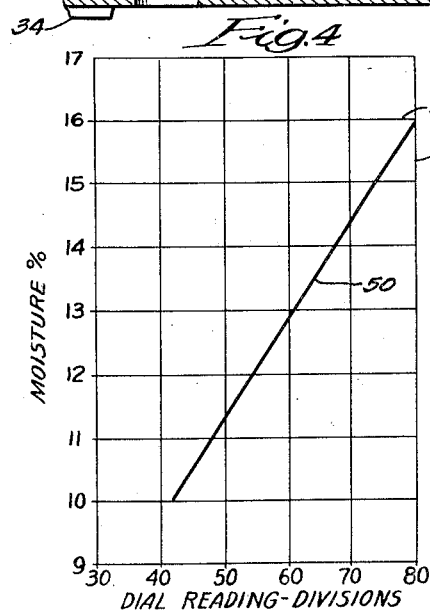
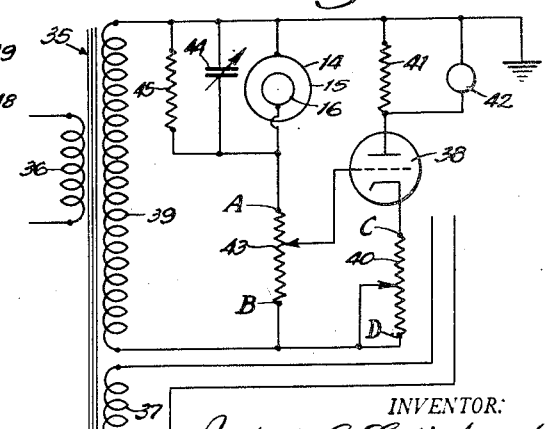
INVENTOR:
Julius A. Edinborgh,
BY
Dawson & Ooms,
ATTORNEYS.

United States Patent Office 2,774,938
Patented Dec. 18, 1956

2,774,938

ELECTRONIC MOISTURE METER

Julius A. Edinborgh, Houston, Tex., assignor to University of Wichita Foundation for Industrial Research, Wichita, Kans., a Kansas foundation Application January 15, 1952, Serial No. 266,580

5 Claims. (Cl. 324—61)

This invention relates to an electronic moisture meter which is particularly useful in determining the moisture content of agricultural products such as grain, grain products, forage, etc.

The determination of moisture in agricultural products such as wheat, corn, grain sorghum, other grains, hay, and other miscellaneous farm products is extremely important. For example, wheat having a moisture content below 12.0% can usually be stored for many years without significant deterioration. However, grain with a moisture content in excess of 14.0% will mold, heat and become unfit for human consumption when stored for only a short time under average conditions. Grain with a high moisture content is particularly vulnerable to damage by insects; conversely dry grain, that is, grain having a moisture content below 12.0%, is normally relatively free from insect damage.

Various estimates place the total economic loss in the United States due to excess moisture in grains alone to be many millions of dollars in an average year. In unusually damp weather, the damage due to excess moisture has been estimated in excess of $15,000,000 in grain handled in the Kansas City terminals alone per season.

A relatively small quantity of excessively wet grain in a bin may become moldy. The musty odors frequently affect the Federal grade of the entire bin of grain causing even the good portion of the grain to grade "musty," thus causing the grain to be judged as unfit for human consumption. This grain can then only be used for feeding purposes.

It is known that a number of electronic moisture meters have been used to determine the moisture content of grains. However, all known meters are far too expensive for the average farmer or small grain elevator operator to purchase, since they are complex, requiring a power supply, oscillator, sensitive indicating meter, voltage regulator, etc. In addition, an amount of grain having a definite weight must be used as the test sample, and this involves the use of weighing scales and increases the time required to complete a test.

It is then an object of this invention to provide a simple and inexpensive electronic moisture meter for determining the moisture content of grains, etc. Another object is to provide an electronic moisture meter in which the measurement of the moisture content is based on a given volume of test sample; the test sample requiring no special preparation. Still another object is to provide a circuit for an electric moisture meter that is simple and inexpensive and yields a high degree of accuracy of measurement. Yet another object is to provide a circuit in which compensation is automatically made for line voltage variations and manufacturing tolerances as part of the measurement procedure. A further object is to provide a condenser that serves as a hopper to receive a test sample of grain in which inaccuracies in the moisture measurements due to end, capacitive effects are virtually eliminated. Other objects and advantages will appear as the specification proceeds.

In my invention, I utilize the principle that the dielectric properties of grain, forage, etc., are a function of their moisture content, and that by measuring the dielectric properties, the moisture content may be determined. To carry out this measurement, I employ simple and inexpensive apparatus in which a given volume of grain is used as the test sample. The measuring circuit I employ operates directly from an A. C. source, and includes only a minimum number of inexpensive components.

My invention can best be understood by referring to a single embodiment illustrated in the drawings in which—

Fig. 1 is a perspective view of the moisture meter comprising my invention; Fig. 2 is a cross-sectional side view taken on the line 2—2 of Fig. 1; Fig. 3 is a schematic wiring diagram; and Fig. 4 is a plan view of a chart for comparing the dial readings with the percentage of moisture in a sample of wheat.

A housing 10 is shown in Figs. 1 and 2. A panel 11 on which most of the components are mounted is fastened to the housing 10 in any suitable manner, as by the screws 12. The panel and housing may be formed of any suitable material; for example, cast metal. At the rear of the housing 10 is a hole or bore 13 into which the cell or hopper 14 is fastened. The hopper 14 comprises an outer shell or electrode 15 which is preferably a metal that is corrosion resistant. Coaxially with the outer shell or electrode 15 is an inner electrode or shell 16. The two electrodes 15 and 16 form the plates of a condenser.

The inner eelctrode 16 is hollow and has a metallic plug 17 inserted in the open, upper end, and a metallic plug 18 inserted in the open, lower end. The upper plug 17 is made conical in shape at the end extending from the shell 16 in order to reduce the end, capacitive effects, that is, the spreading of the lines of flux at the ends of the electrodes. A ring or sheath 18a of insulating material is fastened to the outer shell 15 by suitable means such as a screw 19. This ring acts as a funnel through which the grain is poured into the hopper, and also provides a non-conducting sheath to hold a quantity of grain above the ends of the two electrodes 15 and 16. This has the effect of virtually eliminating end, capacitive effects. The electrode 16 is fastened rigidly to the electrode 15 by means of an insulating spacer 20 and a screw 21 which is fed through a hole 22 in the spacer and into the threaded hole 23 in the plug 18. The screw 24 serves as a locking device for the hopper, securing it rigidly to the housing 10.

At the base of the hopper is an insulating disk 25 fastened to the housing by means of the screw 26. Inserted through an aperture in the center of the disk 25 is a connector 27 which serves to receive the banana plug 28 which is fastened to the screw 21. The connector 27 is electrically connected with the receptacle 29 by wires that are fed through the longitudinal passage 30. The connector 29 receives a banana plug 31 which is mounted on the panel 11, thereby completing the electrical connection between the hopper 14 and the components mounted on the panel 11. The outer shell 15 is connected into the circuit by the mechanical contact between the shell and the housing.

It was found that better results were obtained when the insulating material used for the ring 18a, the spacer 20, and the disk 25 has a low temperature coefficient so that large variations in the dielectric constant of these parts is not caused by temperature variations.

A bracket 32 is secured to the housing 10 by means of the screws 33. The bracket serves as a support for the insulator 34 to which is fastened the connector 29. Feet 34 are provided to support the housing 10. The physical arrangement of the components on the panel 11 is not critical, and they may be placed in any position and secured to the panel by any suitable means.

Accuracy in the moisture determination is considerably improved if the spacing between the inner and outer electrodes 15 and 16 is sufficient to permit the grain particles of a test sample placed in the hopper to assume a random arrangement and to pack fairly tightly under their own weight. This provides a more uniform dielectric. Where larger grains such as corn are tested, this becomes more a consideration. A spacing of ¾ inch has proved satisfactory.

The electric circuit is shown in Fig. 3 and consists of a transformer 35 having a primary winding 36 connected to an A. C. source. The secondary winding 37 of the transformer supplies the filament of the vacuum tube 38. The secondary winding 39 of the transformer supplies high voltage to the tube 38 through the cathode potentiometer 40 and the parallel combination of the resistor 41 and neon tube 42 in the plate circuit of the tube. The secondary winding 39 also supplies high voltage to the grain cell 14 through the potentiometer 43. The cell 14 is paralleled by the variable trimmer condenser 44 and the resistor 45. The trimmer 44 is adjusted to compensate for manufacturing tolerances.

The system is arranged so that if the grid potential of the tube 38 is increased sufficiently, the accompanying increase in plate current, which flows through the resistor 41, will cause a voltage drop across the resistor sufficient to ionize the neon tube 42 and it will begin to conduct current. Thus, a visual indication is provided by the neon tube 42 at the moment it ionizes.

When the cell 14 is filled with grain, its impedance will depend on the dielectric capacity of the grain which separates the two electrodes or plates 15 and 16. Since the dielectric capacity of the grain depends upon its moisture content, the current flowing through the potentiometer 43 is a function of the moisture content of the material filling the cell 14. It follows by Ohm's law that the voltage across the potentiometer 43 is also a function of the moisture content of the dielectric material within the cell, and since this voltage is applied to the grid of the tube 38, the plate current is also a function of the moisture content.

The plate current flowing in the tube 38 is affected by the setting of the cathode potentiometer 40. With a given setting of the potentiometer 40, and with a given sample of grain in the cell 14, there is only one value of grid to cathode voltage which will provide precisely the proper value of plate current flowing through the resistor 41 to supply the ionization voltage required by the neon tube 42. It follows then, that for each value of moisture content of the grain within the cell 14, that there will be a single setting of the potentiometer 43 which will initiate an ionization and visual indication in the neon tube 42. It is possible, therefore, to calibrate the potentiometer 43 experimentally for different moisture contents of a particular grain or material.

The cathode resistor 40 was made variable so that compensation may be made for line voltage fluctuation. The trimmer condenser 44 is provided so that each meter may be adjusted to compensate for manufacturing tolerances.

In operation the potentiometer 43 is turned to its maximum position A. The potentiometer 40 is then adjusted to its maximum position D. The resistance of the potentiometer 40 is then slowly decreased toward the position of minimum resistance C until a visual indication is produced in the neon tube 42. At this point, allowance has been made for line voltage variation from the norm, and the potentiometer 40 is left in this position during the actual test. The cell 14 is then filled with a sample of grain. No special precautions are necessary in filling the cell to an exact level except that the grain should exceed the height of the inner electrode 16.

The potentiometer 43 is then adjusted to its minimum position B. This causes the lamp or tube 42 to deionize since there will no longer be sufficient plate current to provide the required ionization voltage across the resistor 41. The potentiometer 43 is then slowly adjusted toward the maximum position A until the neon lamp 42 again shows an indication. The setting of the dial 46, which is mechanically linked with the potentiometer 43 to adjust its position, is noted on the calibrated scale 47. At the same time the temperature of the test sample is determined by an ordinary mercury thermometer. Knowing the dial setting and the temperature of the sample, the moisture content of the test sample is determined by reference to a chart on which the moisture content of the particular kind of grain being tested is shown as a function of dial reading and temperature. Since grains and other materials have different intrinsic dielectric capacities, a chart must be provided with the meter for each grain or other material that may be tested.

Fig. 4 is an illustration of a chart used with my meter to determine the moisture content of wheat after the temperature and dial reading of a sample is determined in the manner previously described. The vertical lines 48 represent the readings on the scale 47. The horizontal lines 49 represent the percentage of moisture. The generally diagonal line 50 represents the graph for the percentages of moisture at the various dial settings. Charts similar to the one illustrated in Fig. 4 may be provided for the various materials that are tested in the meter.

The procedure used to calibrate the charts will be described by using the calibration of the chart for wheat shown in Fig. 4 as an example. 36 samples of wheat were conditioned to give six samples at six different moisture contents. The true moisture content of each sample was determined in duplicate by the Oven Method as stipulated by the U. S. Department of Agriculture. Each sample was also poured into the hopper of my moisture meter and the dial reading recorded at the same time that the oven determination was being made. The temperature of each sample was recorded in each case.

A second test was conducted to determine the effect of temperature on the dial reading for various samples of wheat over a range of about 70° to 120° F. It was established that the variation between the true moisture content and the dial reading is approximately constant with varying moisture contents through this range of temperature. The readings were then corrected to a standard temperature of 75° F. The correction factor proved to be 0.336 divisions on the chart per degree F. above or below 75° F. This correction factor is added to the dial reading for temperature above 75° F. and subtracted for temperatures below 75° F.

Using this correction factor, the readings obtained in the first test were corrected and then plotted as indicated by the diagonal line 50 on the chart for wheat shown in Fig. 4.

This method of calibration may be used for the various types of grain or other materials for which charts are provided.

Numerous advantages are obtained through use of the structure and circuit arrangement comprising my invention. The circuit has been designed to operate directly from an A. C. source, thus, eliminating the necessity of a power supply to convert the alternating current to direct current. A high frequency oscillator is not needed as a source of voltage. The neon indicator tube supplies the only visual indication necessary, and costly indicating devices are dispensed with. Providing the potentiometer 40 in the cathode of the tube 38 results in increased accuracy in the moisture determinations since the readings are independent of substantial line voltage variations. Also, slow variations in the values of the components throughout the life of the instrument are compensated for since the instrument is recalibrated each time that a measurement is made.

Accuracy in the moisture content determination of materials tested in this meter is very satisfactory, and the substantial savings in cost of construction through simplification of the structure and circuits is very advantageous.

While in the foregoing specifications, I have set forth a single structure and circuit arrangement in great detail for the purpose of illustrating an embodiment of my invention, it will be understood that such details may be varied widely by those skilled in the art without departing from the spirit and scope of my invention.

I claim:

1. In electronic apparatus for measuring the moisture content of grain or the like, a condenser adapted to form a grain receiving hopper comprising an outer, hollow cylindrical surface of conductive material open at both ends and having a length substantially greater than its diameter, an inner, hollow cylindrical surface of conductive material having a diameter substantially smaller than the diameter of said outer cylindrical surface and a length less than that of said outer surface, the upper end of said inner surface being open, means at the lower end of said outer surface to support said inner cylindrical surface coaxially within said outer surface in electrically insulated relation therewith, electric means connected with said inner and outer surfaces for determining the dielectric capacity of a grain placed within said condenser, a cone-shaped plug inserted in the open upper end of said inner cylindrical surface and terminating in a point in substantial alignment with the upper edge of said outer surface and a funnel of insulating material having a relatively low temperature coefficient and extending from said outer surface and adapted to hold a quantity of grain above the point of said cone and upper edge of said outer surface, whereby the end, capacitive effects are substantially eliminated and the accuracy of the dielectric measurement is increased, said condenser being dimensioned and arranged to receive grain to an elevation substantially above the point of said cone and upper edge of said outer surface.

2. Apparatus for measuring the moisture content of grain or the like, comprising a housing, a condenser mounted upon said housing and having a hollow cylindrical outer electrode and an inner cylindrical electrode of smaller diameter mounted coaxially therewith to form a hopper adapted to receive grain whereby the impedance of said condenser is a function of the dielectric capacity of the grain received between the electrodes thereof, the diameter of said inner electrode being substantially smaller than the diameter of said outer electrode so that the grain received between the electrodes will pack in a relatively tight and random arrangement, the length of said inner electrode being substantially less than that of said outer electrode, said inner electrode being equipped at the upper end thereof with a cone-shaped member terminating in a point in substantial alignment with the upper edge of said outer electrode and said outer electrode being equipped with a funnel formed of insulating material, said condenser being adapted to receive therein a quantity of grain to an elevation substantially above the point of said cone and above the upper edge of said outer electrode whereby end capacitive effects are substantially eliminated, and electronic circuit means connected with said condenser for determining the moisture content of grain introduced between the electrodes of the condenser, comprising an electronic tube having an anode, cathode and control grid, means coupling said condenser to the control grid of said tube including a potentiometer so that the potential on the grid of said tube is a function of the impedance of said condenser, said potentiometer being connected in series with said condenser and having the variable tap thereof connected to said control grid, a neon lamp in the anode circuit of said discharge tube and a fixed resistor in parallel therewith so that the neon tube is ionized when the current flowing in the plate circuit of said tube reaches a predetermined value, a source of alternating current connected between the anode and cathode of said electron tube and across said condenser in series with said potentiometer, and a fixed resistor in parallel with said condenser.

3. In electronic apparatus for measuring the moisture content of grain and the like, a condenser adapted to form a grain-receiving hopper and comprising an outer cylindrical shell of conductive material and having a length substantially greater than its diameter, an inner cylindrical shell of conductive material having a diameter substantially smaller than the diameter of said outer shell and having a length slightly less than that of said outer shell, support means for supporting said inner shell coaxially within said outer shell and in electrically-insulated relation therewith, electric means connected in circuit with said inner and outer shells for determining the dielectric capacity of a grain placed within said condenser, a cone-shaped plug providing a closure for the upper end of said inner shell and terminating in a point substantially in alignment with the upper edge of said outer shell, and a funnel formed of insulating material and carried by said outer shell and extending thereabove, said funnel being arranged to receive a quantity of grain at an elevation above the point of said plug and above the edge of said outer shell, whereby the end capacitive effects are substantially eliminated and the accuracy of the dielectric measurement is increased.

4. In electronic apparatus for measuring the moisture content of grain and the like, a condenser adapted to form a grain-receiving hopper and comprising an outer cylindrical shell formed of conductive material and being open at both ends, said shell having a length substantially greater than its diameter, an inner cylindrical shell formed of conductive material and having a diameter substantially smaller than the diameter of said outer shell and a length substantially less than that of said outer shell, means for supporting said inner shell in coaxial relation within said outer shell and for providing a bottom closure for said outer shell, said inner and outer shells being in electrically-insulated relation, a cone-shaped plug carried by the upper end of said inner shell and providing an apex in substantial alignment with the upper edge of said outer shell, a funnel carried by said outer shell adjacent the upper edge thereof and projecting upwardly therefrom, said funnel being formed of a material having a relatively low temperature coefficient, said condenser being dimensioned and arranged to receive grain therein to an elevation substantially above the point of said plug and upper edge of said outer shell whereby the grain is contained by said funnel and the end capacitive effects are substantially eliminated and the accuracy of the dielectric measurement is thereby increased.

5. In apparatus of the character described, a condenser adapted to be in circuit with electric means for determining the dielectric capacity thereof, comprising an elongated inner cylindrical shell open at both ends and having a length substantially greater than its diameter, a cone-shaped plug mounted within the upper end of said inner shell and providing a closure therefor, an outer cylindrical shell having a diameter substantially greater than the diameter of said inner shell and a length exceeding the length of said inner shell and having an upper edge terminating in substantial alignment with the upper end of said plug, an insulating funnel carried by the upper end of said outer shell and extending thereabove, and insulating support means providing a bottom closure for said outer shell and providing also a support for said inner shell to hold the same in substantially coaxial relation within said outer shell, said condenser being adapted to receive a quantity of grain to an elevation above the end of said plug and above the upper edge of said outer shell so that a portion of grain being tested is operative to substantially eliminate the end capacitive effects of said condenser whereby the accuracy of the dielectric measurement is increased.

References Cited in the file of this patent

UNITED STATES PATENTS

| | | |
|---|---|---|
| 2,272,239 | Delmhorst | Feb. 10, 1942 |
| 2,349,992 | Schrader | May 30, 1944 |
| 2,422,742 | Odessey | June 24, 1947 |
| 2,477,511 | Comb | July 26, 1949 |
| 2,507,324 | Taborsky | May 9, 1950 |
| 2,693,575 | Greenwood et al. | Nov. 2, 1954 |

FOREIGN PATENTS

| | | |
|---|---|---|
| 557,613 | Great Britain | Nov. 29, 1943 |
| 559,240 | Great Britain | Feb. 10, 1944 |
| 647,990 | Great Britain | Dec. 28, 1950 |